US012793633B2

(12) United States Patent
Lee

(10) Patent No.: US 12,793,633 B2
(45) Date of Patent: Nov. 10, 2026

(54) DISPLAY DEVICE FOR CHANGING AN EMISSION SIGNAL VOLTAGE BASED ON LUMINANCE BETWEEN ADJACENT FRAMES

(71) Applicant: LG Display Co., Ltd., Seoul (KR)

(72) Inventor: Junho Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 61 days.

(21) Appl. No.: 18/785,037

(22) Filed: Jul. 26, 2024

(65) Prior Publication Data

US 2025/0209980 A1 Jun. 26, 2025

(30) Foreign Application Priority Data

Dec. 20, 2023 (KR) ........................ 10-2023-0186613

(51) Int. Cl.
*G09G 3/3233* (2016.01)
*G09G 3/20* (2006.01)

(52) U.S. Cl.
CPC ......... *G09G 3/3233* (2013.01); *G09G 3/2092* (2013.01); *G09G 2300/0819* (2013.01); *G09G 2300/0842* (2013.01); *G09G 2300/0861* (2013.01); *G09G 2310/0289* (2013.01); *G09G 2310/08* (2013.01); *G09G 2320/0233* (2013.01)

(58) Field of Classification Search
CPC ............... G09G 3/3233; G09G 3/2092; G09G 2310/0289; G09G 2310/08; G09G 2320/0233
See application file for complete search history.

(56) References Cited

U.S. PATENT DOCUMENTS

| | | | | |
|---|---|---|---|---|
| 9,786,216 | B2 * | 10/2017 | Tatsumi | G09G 3/342 |
| 2017/0092191 | A1 * | 3/2017 | An | G09G 3/3233 |
| 2023/0113452 | A1 * | 4/2023 | Kim | G09G 3/3266 345/691 |
| 2023/0306906 | A1 * | 9/2023 | Yang | G09G 3/3233 |
| 2024/0135885 | A1 * | 4/2024 | Shi | G09G 3/2007 |
| 2024/0274090 | A1 * | 8/2024 | Yamamoto | G09G 3/20 |
| 2025/0006135 | A1 * | 1/2025 | Park | G09G 3/3233 |
| 2025/0014518 | A1 * | 1/2025 | Kong | G09G 3/32 |

FOREIGN PATENT DOCUMENTS

| | | | |
|---|---|---|---|
| KR | 20170021427 | A | 2/2017 |
| KR | 20200076012 | A | 6/2020 |

* cited by examiner

*Primary Examiner* — Benjamin C Lee
*Assistant Examiner* — Emily J Frank
(74) *Attorney, Agent, or Firm* — Fish & Richardson P.C.

(57) ABSTRACT

A display device including a display panel on which pixels are disposed, a timing controller configured to output image data and an emission driving control signal based on an image signal and a control signal that are output from an external component, a gate driver configured to apply a gate signal to the pixels, a data driver configured to apply a data voltage corresponding to the image data to the pixels, an emission driver configured to apply an emission signal to the pixels based on the emission driving control signal, and an emission signal voltage controller configured to change a voltage of the emission signal, and a method of driving the same.

12 Claims, 10 Drawing Sheets

DISPLAY DEVICE FOR CHANGING AN EMISSION SIGNAL VOLTAGE BASED ON LUMINANCE BETWEEN ADJACENT FRAMES

CROSS REFERENCE TO RELATED APPLICATION

The present application claims the priority of Korean Patent Application No. 10-2023-0186613, filed on Dec. 20, 2023, the entire contents of which is incorporated herein for all purposes by this reference.

BACKGROUND

Field of the Disclosure

The present disclosure relates to a display device and a method of driving the same.

Description of the Background

As the information society develops, various demands for display devices for displaying images are increasing, and various types of display devices such as liquid crystal display (LCD) devices and organic light emitting diode (OLED) display devices are utilized.

Images displayed on a display device may be still images or moving images, and the moving image may include various types such as sports images, game images, and movies. The display device is driven in a variable refresh rate (VRR) mode in which a driving frequency varies depending on the type of an image, thereby reducing power consumption and extending the lifetime of the display device.

SUMMARY

Accordingly, the present disclosure is directed to a display device and a method of driving the same that substantially achieve the described above.

More specifically, a display device is to provide for changing a voltage of an emission signal based on a luminance difference between adjacent frames during low-speed driving, and a method of driving the same.

The present disclosure is also to provide a display device for controlling a gate high voltage to a lower voltage when a luminance difference between adjacent frames is greater than or equal to a predetermined critical value, and a method of driving the same.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a display device includes a display panel at which pixels are disposed, a timing controller configured to output image data and an emission driving control signal based on an image signal and a control signal that are output from the outside, a gate driver configured to apply a gate signal to the pixels, a data driver configured to apply a data voltage corresponding to the image data to the pixels, an emission driver configured to apply an emission signal to the pixels based on the emission driving control signal, and an emission signal voltage controller configured to change a voltage of the emission signal.

The emission signal may be a square wave signal including a gate high voltage period and a gate low voltage period, and the emission signal voltage controller may change the gate high voltage based on a luminance difference of the image data between adjacent frames.

The emission signal voltage controller may set the gate high voltage to a first gate high voltage when the luminance difference between the adjacent frames is smaller than a critical value, and set the gate high voltage to a second gate high voltage smaller than the first gate high voltage when the luminance difference between the adjacent frames is greater than the critical value.

The display panel may be driven in a combination of a refresh frame in which the data voltage is programmed to the pixels and one or more skip frames in which the programming of the data voltage is omitted.

The adjacent frames may include the refresh frame.

When the luminance difference between the adjacent frames is greater than the critical value, the gate high voltage may be set to the second gate high voltage during the refresh frame, and the gate high voltage may be set to the first gate high voltage during the one or more skip frames after the refresh frame.

The emission signal voltage controller may include an information collector configured to measure a first frame response time during low-frequency driving, determine the first gate high voltage in response to the first frame response time, and determine the second gate high voltage for allowing the luminance difference between the adjacent frames to be smaller than the critical value, an image analyzer configured to acquire the image data on a frame basis when the display panel is being driven at the low frequency and determine the luminance difference of the image data between the adjacent frames, and a voltage selector configured to select the first gate high voltage as the gate high voltage when the luminance difference is smaller than the critical value and select the second gate high voltage as the gate high gate voltage when the luminance difference is greater than or equal to the critical value.

The emission driver may include a level shifter configured to generate a clock signal having a level between the gate high voltage and the gate low voltage, and a shift register configured to output the emission signal based on the clock signal output from the level shifter.

The pixel may include a light emitting element configured to emit light with a luminance corresponding to a driving current, a driving transistor configured to control the driving current flowing through the light emitting element, a first transistor configured to apply the data voltage to a second electrode of the driving transistor in response to a second scan signal, a second transistor configured to connect a gate electrode of the driving transistor to a first electrode of the driving transistor in response to a first scan signal, a storage capacitor connected between the gate electrode of the driving transistor and an anode electrode of the light emitting element, a third transistor configured to form a current path between a high potential driving voltage and the first electrode of the driving transistor in response to a second emission signal, and a fourth transistor configured to form a current path between the driving transistor and the light emitting element in response to a first emission signal.

The driving current may be controlled as the gate high voltages of the first emission signal and the second emission signal are changed.

The pixel may further include a fifth transistor configured to apply an initialization voltage to the anode electrode of the light emitting element in response to the first scan signal.

In another aspect of the present disclosure, a method of driving a display device including a display panel at which pixels are disposed and an emission driver for applying an emission signal to the pixels, the method includes a skip frame during which the emission driver applies the emission signal having a first gate high voltage to the pixels during low-frequency driving; and a refresh frame during which the emission driver applies the emission signal having a second gate high voltage differing from the first gate high voltage to the pixels after the skip frame.

A data voltage corresponding to image data may be programmed to the pixels during the refresh frame, and the programming of the data voltage may be omitted during the skip frame.

The second gate high voltage may be determined based on a luminance difference between adjacent frames.

The second gate high voltage may be smaller than the first gate high voltage.

The first gate high voltage may be determined according to a first frame response time during the low-frequency driving.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
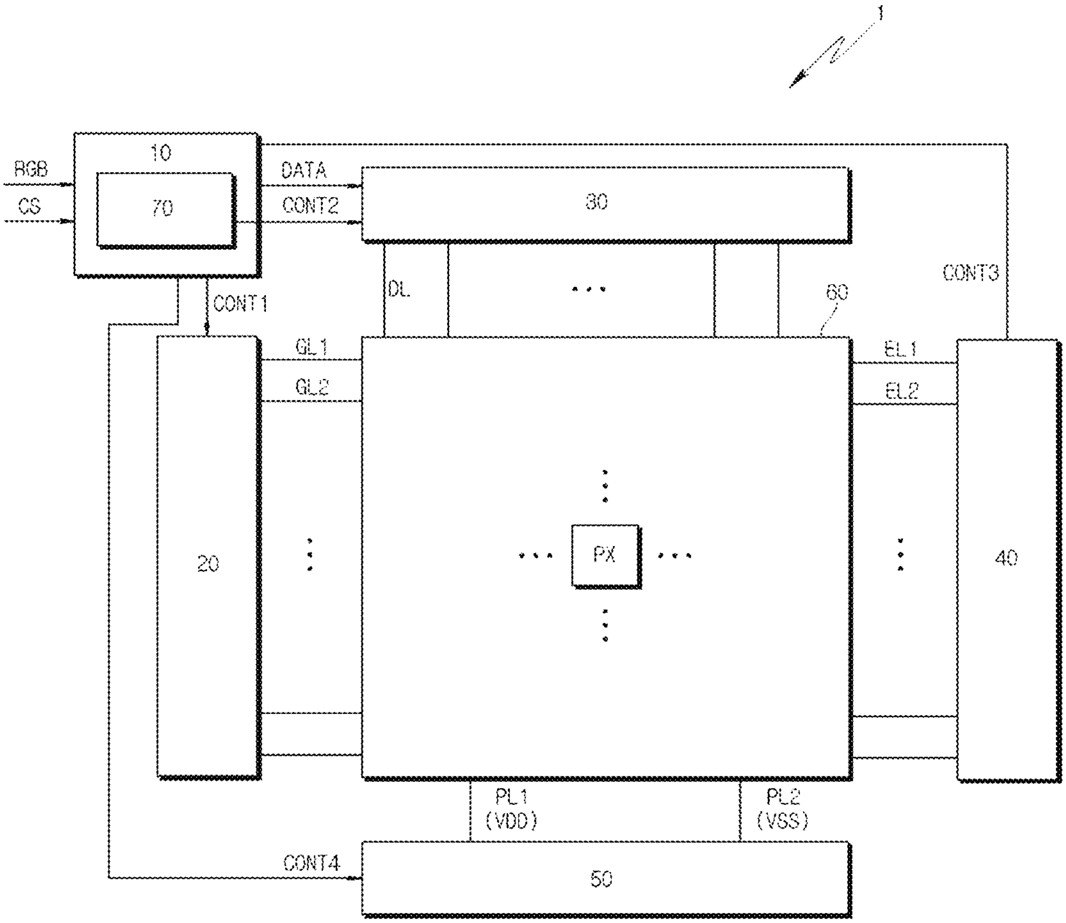
FIG. 1 is a block diagram showing a configuration of a display device according to one aspect.

Hereinafter, aspects will be described with reference to the accompanying drawings. In the specification, when a first component (or an area, a layer, a portion, or the like) is described as "on," "connected," or "coupled to" a second component, it means that the first component may be directly connected/coupled to the second component or a third component may be disposed therebetween.

The same reference numerals indicate the same components. In addition, in the drawings, thicknesses, proportions, and dimensions of components are exaggerated for effective description of technical contents. The term "and/or" includes all one or more combinations that may be defined by the associated configurations.

Terms such as first and second may be used to describe various components, but the components are not limited by the terms. The terms are used only for the purpose of distinguishing one component from another. For example, a first component may be referred to as a second component, and similarly, the second component may also be referred to as the first component without departing from the scopes of the aspects. The singular expression includes the plural expression unless the context clearly dictates otherwise.

Terms such as "under," "at a lower side," "above," and "at an upper side" are used to describe the relationship between the components illustrated in the drawings. The terms are relative concepts and are described with respect to directions marked in the drawings.

It should be understood that term such as "includes" or "has" is intended to specify the presence of features, numbers, steps, operations, components, parts, or a combination thereof described in the specification and does not preclude the presence or addition possibility of one or more other features, numbers, steps, operations, components, parts, or combinations thereof in advance.

FIG. 1 is a block diagram showing a configuration of a display device according to one aspect.

Referring to FIG. 1, a display device 1 includes a timing controller 10, a gate driver 20, a data driver 30, an emission driver 40, a power supply unit 50, and a display panel 60.

The timing controller 10 may receive image signals RGB and a control signal CS from an external host system or the like. The image signals RGB may include a plurality of grayscale data. The control signal CS may include, for example, a horizontal synchronization signal, a vertical synchronization signal, a main clock signal, and the like.

The timing controller 10 may process the image signals RGB and the control signal CS according to operating conditions of the display panel 60, and generate and output image data DATA, a gate driving control signal CONT1, a data driving control signal CONT2, an emission driving control signal CONT3, and a power supply control signal CONT4.

The gate driver 20 may generate scan signals based on a gate driving control signal CONT1 output from the timing controller 10. The gate driver 20 may provide the generated scan signals to pixels PX through a plurality of gate lines GL1 and GL2.

The data driver 30 may generate data signals based on the image data DATA and the data driving control signal CONT2 that are output from the timing controller 10. The data driver 30 may provide the generated data signals to the pixels PX through a plurality of data lines DL.

The emission driver 40 may generate emission signals based on the emission driving control signal CONT3 output from the timing controller 10. The emission driver 40 may provide the generated emission signals to the pixels PX through a plurality of emission lines EL1 and EL2.

The power supply unit 50 may generate a high potential driving voltage VDD and a low potential driving voltage VSS to be provided to the display panel 60 based on the power supply control signal CONT4. The power supply unit 50 may provide the generated driving voltages VDD and VSS to the pixels PX through the corresponding power lines PL1 and PL2.

A plurality of pixels PX (or referred to as sub-pixels) are disposed at the display panel 60. The pixels PX maybe charged with the data voltages supplied through the data lines DL in response to the scan signals applied through the gate lines GL1 and GL2 and emit light with luminance corresponding to the charged data voltages in response to the emission signals applied through the emission lines EL1 and EL2.

In one aspect, each pixel PX may display one of red, green, and blue. In another aspect, each pixel PX may display one of cyan, magenta, and yellow. In various aspects, each pixel PX may display one of red, green, blue, and white.

The timing controller 10, the gate driver 20, the data driver 30, the emission driver 40, and the power supply unit 50 may each be configured as a separate integrated circuit (IC) or at least a partially integrated IC. In addition, the gate driver 20 and the emission driver 40 may be configured in a gate in panel type formed integrally with the display panel 60. In the present aspect, the gate driver 20 and the emission driver 40 may constitute a gate-in-panel (hereinafter referred to as "GIP") type.

The display device 1 according to one aspect may further include an emission signal voltage controller 70. The emission signal voltage controller 70 may be included in the timing controller 10 as shown or mounted in the same module as the power supply unit 50. However, the present aspect is not limited thereto. That is, the emission signal voltage controller 70 may be provided as an independent component.

The emission signal voltage controller 70 may change a voltage of the emission signal output from the emission driver 40. For example, the emission signal voltage controller 70 may change the voltage of the emission signal by adjusting the driving voltage supplied to the emission driver 40, particularly the magnitude of a gate high voltage based on a change in luminance between adjacent frames. A more detailed operation of the emission signal voltage controller 70 will be described below.

In one aspect, the display device 1 may be driven in a variable refresh rate mode in which a driving frequency may be changed. For example, the display device 1 may be driven at a refresh rate that is higher or lower than a predetermined reference refresh rate. When the display device 1 is driven at a rate lower than a reference refresh rate, it may be referred to as "low-speed driving" or "low-frequency driving," and when the display device 1 is driven at a rate higher than the reference refresh rate, it may be referred to as "high-speed driving" or "high-frequency driving." The refresh rate may be determined according to the type of image to be displayed or the like, but is not limited thereto.

The timing controller 10 may generate the control signals CONT1 to CONT4 so that the pixel PX may be driven at various refresh rates. For example, the timing controller 10 may change the refresh rate by changing a frequency of the clock signal included in the control signals CONT1 to CONT4, adjusting the timing of the horizontal synchronization signal or the vertical synchronization signal, or driving the gate driver 20 in a mask manner.

Figure 2:
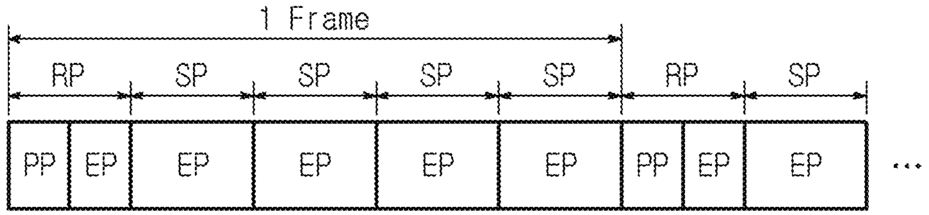
FIG. 2 is a view showing a method of driving the display device according to one aspect.

FIG. 2 is a view showing a method of driving the display device according to one aspect.

In the variable refresh rate mode, the display panel 60 (see FIG. 1) may be driven in a combination of at least one refresh frame RP and at least one skip frame SP. During the refresh frame RP, new image data may be provided to the display panel 60 so that each pixel PX (see FIG. 1) may be programmed to a new data voltage, and the light emitting element of the pixel PX may emit light in response to the programmed data voltage. The refresh frame RP may be sub-divided into an initialization period, a sampling and programming period, a hold period, etc. for data voltage programming.

A process of programming the new data voltage to the pixel PX during the skip frame SP is omitted. During the skip period SP, the light emitting element of each pixel PX may emit light in response to the data voltage programmed during the previous refresh period RP. The skip frame SP may be referred to as a hold frame.

In one aspect, to change the refresh rate, a length of one frame may be changed by adjusting the number or lengths of skip periods SP. Then, a length of the refresh frame RP may be sufficiently secured so that the data voltage may be stably programmed.

In the present aspect, a generation cycle of the refresh period RP may be changed depending on the variable refresh rate. The generation cycle of the refresh period RP increases as the refresh rate decreases, and the number of skip periods SP between the refresh periods RP increases as the refresh rate decreases.

For example, the generation cycle of the refresh period RP may be 1 second/120 at 120 Hz, 1 second/60 at 60 Hz, 1 second/24 at 24 Hz, and 1 second at 1 Hz. The number of skip periods SP located between two neighboring refresh periods RP may be 0 at 120 Hz, 1 at 60 Hz, 4 at 24 Hz, and 9 at 1 Hz, and in FIG. 2, an example of 24 Hz is shown. However, the present aspect is not limited thereto.

The refresh period RP includes a programming period PP and an emission period EP. During the programming period PP, a new data voltage is programmed to the pixel circuits PX, and during the emission period EP, the pixel PX emits light in response to the programmed data voltage.

The skip period SP includes only the emission period EP in which the emission signal EM (see FIG. 1) has a turn-on level. During the emission period EP, the pixels PX maintain the luminous luminance of the previous refresh period RP.

Figure 3:
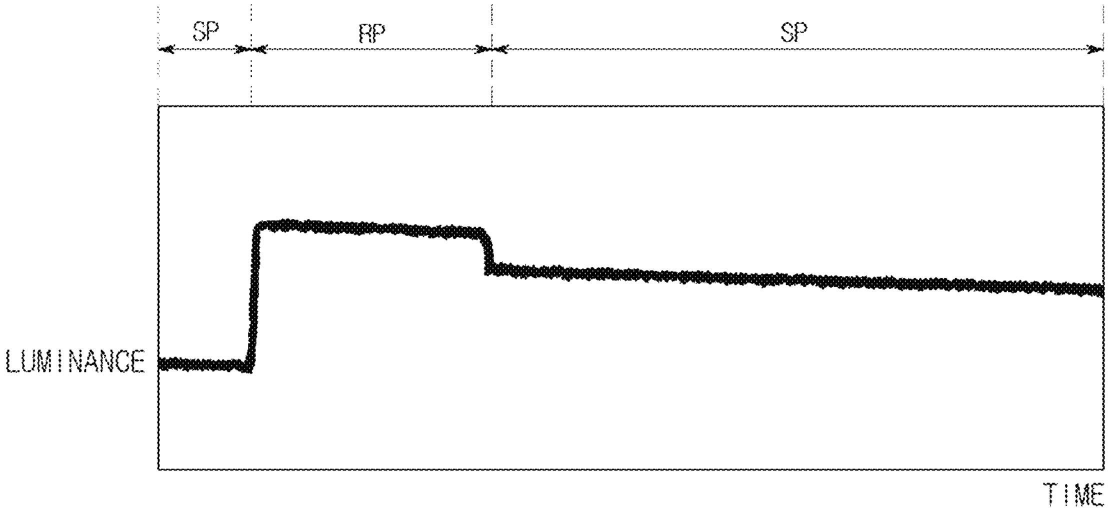
FIG. 3 is a view showing a change in luminance of a pixel according to one aspect.

FIG. 3 is a view showing a change in luminance of a pixel according to one aspect.

Referring to FIGS. 2 and 3 together, in one aspect, when the data voltage is programmed during the refresh frame RP after the skip frame SP, a temporary potential difference may occur between the source electrode and drain electrode of the driving transistor in the pixel PX (see FIG. 1). Therefore, when the emission signal EM (see FIG. 1) is turned on, the luminance of the pixel PX may rapidly increase as shown.

Such a phenomenon becomes more serious when the luminance of the pixel PX gradually decreases during the skip frame SP due to a leakage current, etc. in the pixel PX or the luminance of the image data DATA (see FIG. 1) displayed during the refresh frame RP after the skip frame SP is a predetermined level higher than the luminance displayed during the skip frame SP.

A section in which such a quick increase in luminance occurs may have about 1 second according to a response time of the pixel PX, etc., and as described above, the quick increase in luminance for a relatively short time may be visible to a user as flicker, resulting in degradation of the image quality of the display 1 (see FIG. 1). Hereinafter, aspects for preventing such a flicker phenomenon will be described.

Figure 4:
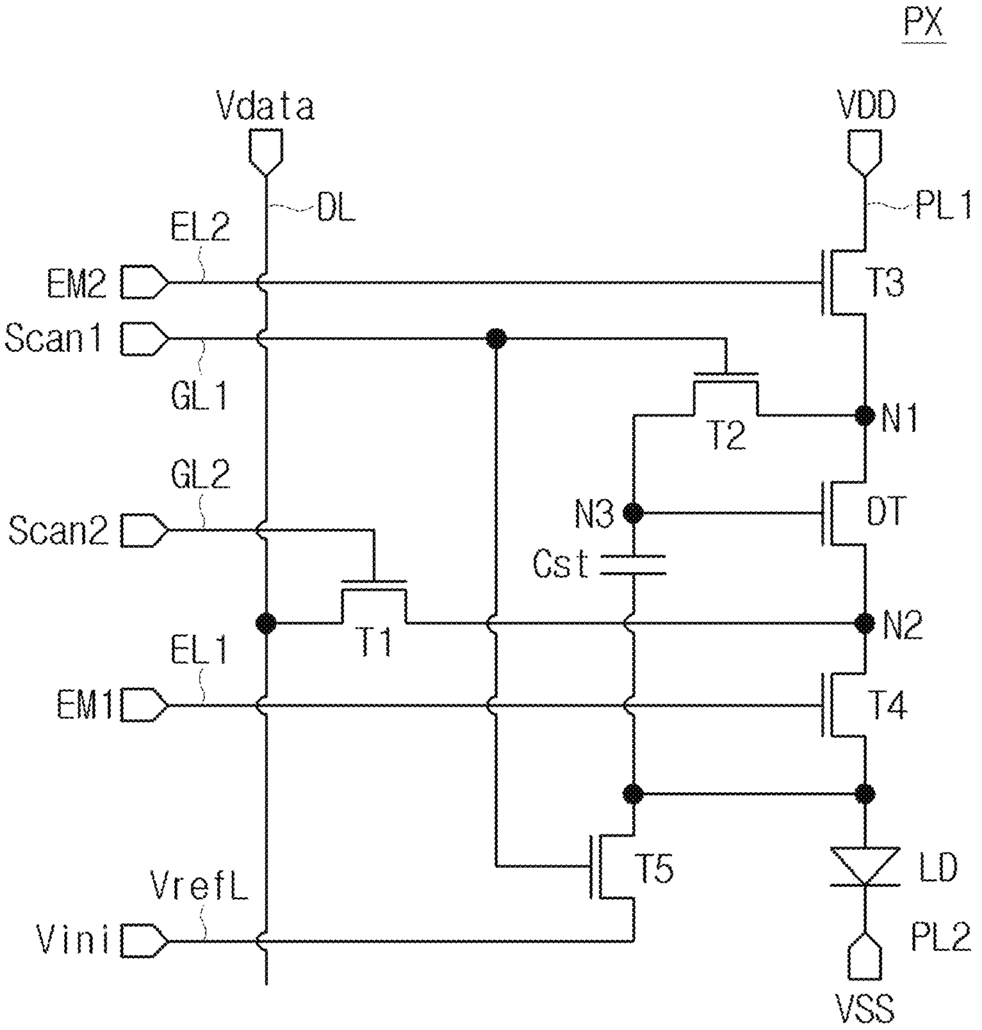
FIG. 4 is a circuit diagram of the pixel according to one aspect.

FIG. 4 is a circuit diagram of the pixel according to one aspect.

Referring to FIG. 4, the pixel PX according to one aspect may include a driving transistor DT, a light emitting element LD connected to the driving transistor DT, and a control circuit for controlling the amount of driving current to be applied to the light emitting element LD through the driving transistor DT. For example, the control circuit may include first to fifth transistors T1 to T5 and a storage capacitor Cst.

The driving transistor DT controls the driving current applied to the light emitting element LD according to a gate-source voltage Vgs. A first electrode (e.g., a source electrode) of the driving transistor DT is connected to a first power line PL1 to which a high potential driving voltage VDD is applied through a first node N1, and a second electrode (e.g., a drain electrode) thereof is connected to the light emitting element LD through a second node N2. A gate electrode of the driving transistor DT is connected to the third node N3. The driving transistor DT may be turned on according to a voltage applied to the third node N3 to control the amount of driving current flowing to the light emitting element LD.

A first transistor T1 is connected between the data line DL and the second node N2. A gate electrode of the first transistor T1 is connected to the gate line GL2. The first transistor T1 may be turned on in response to a second scan signal Scan2 applied to the second gate line GL2. When the first transistor T1 is turned on, a data voltage Vdata applied to the data line DL may be applied to the second node N2, that is, the second electrode of the driving transistor DT.

The second transistor T2 is connected between the gate electrode of the driving transistor DT, that is, the third node N3 and the first electrode, that is, the first node N1. A gate electrode of the second transistor T2 is connected to the first gate line GL1. The second transistor T2 may be turned on in response to a first scan signal Scan1 applied to the first gate line GL1 to electrically connect the gate electrode of the driving transistor DT with the first electrode.

The storage capacitor Cst is connected between the third node N3, that is, the gate electrode of the driving transistor DT and a fourth node N4, that is, an anode electrode of the light emitting element LD. The storage capacitor Cst may be used to sample a threshold voltage of the driving transistor DT according to a source-follower method.

A third transistor T3 is connected between the first power line PL1 to which the high potential driving voltage VDD is applied and the driving transistor DT, that is, the first node N1. A gate electrode of the third transistor T3 is connected to the second emission line EL2. The third transistor T3 may be turned on in response to an emission signal EM2 applied to the second emission line EL2. The second emission signal EM2 may be a predetermined square wave signal including a gate high voltage period and a gate low voltage period.

A fourth transistor T4 is connected between the driving transistor DT, that is, the second node N2 and the light emitting element LD. A gate electrode of the fourth transistor T4 is connected to the first emission line EL1. The fourth transistor T4 may be turned on in response to a first emission signal EM1 applied to the first emission line EL1. The first emission signal EM1 may be a predetermined square wave signal including a gate high voltage period and a gate low voltage period.

When the third transistor T3 and the fourth transistor T4 are turned on, a current path flowing from the high potential driving voltage VDD to the light emitting element LD may be formed to allow the driving current to flow to the light emitting element LD. The light emitting element LD may emit light with brightness corresponding to the amount of driving current applied.

The fifth transistor T5 is connected between an initialization voltage line ViniL to which an initialization voltage Vini is applied and the fourth node N4, that is, the anode electrode of the light emitting element LD. A gate electrode of the fifth transistor T5 is connected to the first gate line GL1. The fifth transistor T5 may be turned on in response to the first scan signal Scan1 applied to the first gate line GL1. When the fifth transistor T5 is turned on, the initialization voltage Vini may be applied to the anode electrode of the light emitting element LD. The fifth transistor T5 is provided to initialize the anode electrode of the light emitting element LD.

The light emitting element LD may have the anode electrode connected to the fourth node N4 and a cathode electrode connected to the second power line PL2 to which the low potential driving voltage VSS is applied. When the driving transistor DT and the third and fourth transistors T3 and T4 are turned on, a current path may be formed between the high potential driving voltage VDD and the low potential driving voltage VSS to allow the driving current to flow to the light emitting element LD. The light emitting element LD may emit light with brightness corresponding to the amount of driving current applied.

In the aspect shown in FIG. 4, the transistors of the pixel PX may be formed of oxide semiconductor thin film transistors. The oxide semiconductor thin film transistor includes a gate electrode, a source electrode, and a drain electrode. The oxide semiconductor thin film transistor has an active layer formed of an oxide semiconductor. Here, the oxide semiconductor may be set to an amorphous or crystalline oxide semiconductor. The oxide semiconductor thin film transistor may be formed of an n-type transistor. The oxide semiconductor thin film transistor may be processed at low temperatures and has lower charge mobility than a low temperature poly-silicon (LTPS) thin film transistor. The oxide semiconductor thin film transistor has excellent off-current characteristics.

However, the present aspect is not limited thereto. That is, in another aspect, one or more transistors of the pixel PX may be p-type transistors or the LTPS thin film transistors. The LTPS thin film transistor includes a gate electrode, a source electrode, and a drain electrode. The LTPS thin film transistor has an active layer made of polysilicon. The LTPS thin film transistor has high electron mobility, and thus has fast driving characteristics. The LTPS thin film transistor may be formed of a p-type thin film transistor or an n-type thin film transistor.

Figure 5:
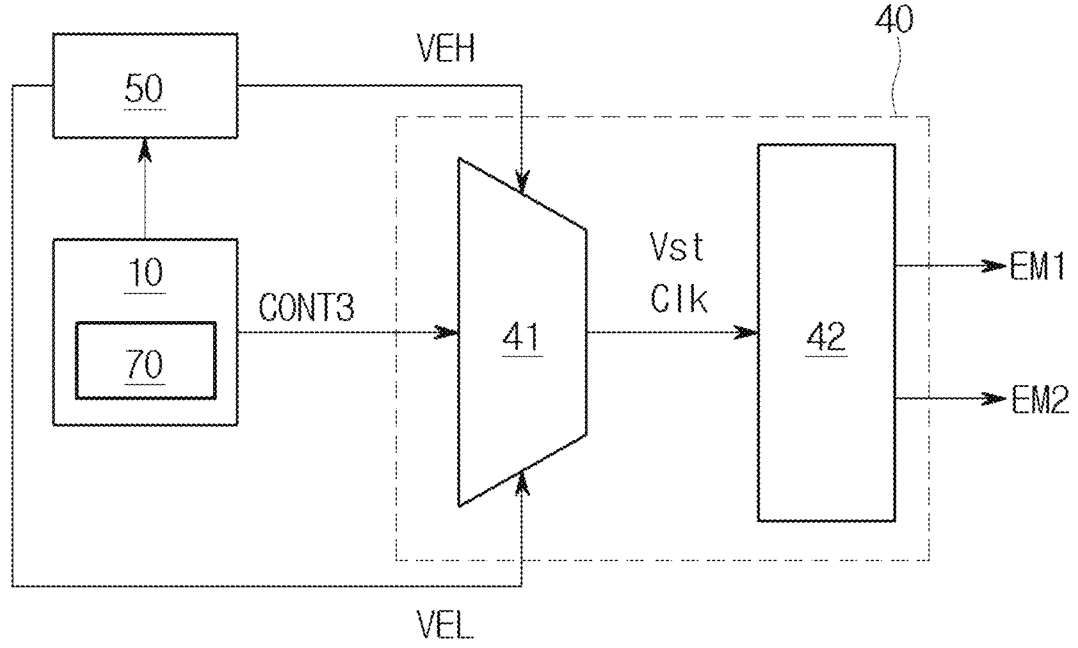
FIG. 5 is a block diagram showing a configuration of an emission driver according to one aspect.

FIG. 5 is a block diagram showing a configuration of an emission driver according to one aspect.

Referring to FIG. 5, the emission driver 40 may include a level shifter 41 and a shift register 42.

The level shifter 41 may generate a clock signal Clk, a start signal Vst, etc. based on the emission driving control signal CONT3 supplied from the timing controller 10 and the driving voltages supplied from the power supply unit 50. The driving voltage may include a gate high voltage VEH and a gate low voltage VEL. The level shifter 41 may generate the clock signal Clk having a voltage level between the gate high voltage VEH and the gate low voltage VEL. The clock signal Clk may be generated in the form of n phases having different phases, such as 2-phase, 4-phase, and 8-phase (n is an integer greater than or equal to 2).

The shift register 42 may output the emission signals EM1 and EM2 that may turn on or turn off the transistor formed on the display panel 60 based on the signals Clk and Vst output from the level shifter 41. The output emission signals EM1 and EM2 may be a predetermined square wave signal including a gate high voltage VEH period and a gate low voltage VEL period.

In one aspect, the driving voltage, particularly, the gate high voltage VEH applied to the level shifter 41 may be changed. For example, the gate high voltage VEH may be changed depending on a luminance difference between adjacent frames through the emission signal voltage controller 70.

Figure 6:
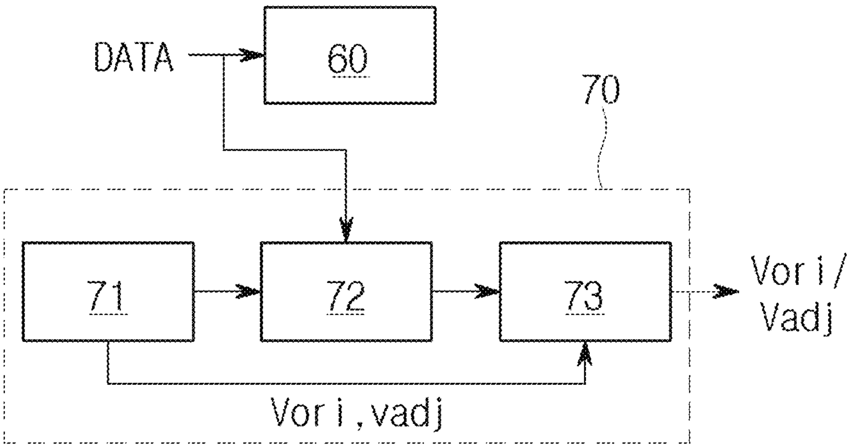
FIG. 6 is a block diagram showing a configuration of an emission signal voltage controller according to one aspect.

FIG. 6 is a block diagram showing a configuration of an emission signal voltage controller according to one aspect.

As described with reference to FIG. 5, the emission signal voltage controller 70 is configured to change the driving voltage, particularly, the gate high voltage VEH applied to the emission driver 40. For example, the emission signal voltage controller 70 may change the gate high voltage VEH according to a change in luminance of the image data DATA between adjacent frames during low-frequency driving. To this end, the emission signal voltage controller 70 may include an information collector 71, an image determinator 72, and a voltage selector 73.

The information collector 71 may measure a first frame response (FFR) during the low-frequency driving. When luminance changes between adjacent frames, a response time of the first frame in which the input image starts to be displayed may be changed by the time required for the hysteresis characteristics of the driving transistor DT (see FIG. 4) to change. During the low-frequency driving, the response time may increase in the refresh frame RP after the skip frame SP in which luminance significantly changes between adjacent frames.

The information collector 71 may determine first gate high voltages Vori of the emission signals EM1 and EM2 optimized according to the first frame response time. That is, the first gate high voltage Vori may biases the first electrode and the gate electrode of the driving transistor DT to predetermined voltages before the threshold voltage of the driving transistor DT is sampled to be determined to be predetermined levels to minimize the first frame response time.

In addition, the information collector 71 may measure second gate high voltages Vadj of the emission signals EM1 and EM2, which causes a luminance difference of the pixel PX between adjacent frames to be smaller than a predetermined critical value.

As described above, when the luminance of the image data DATA (see FIG. 1) changes significantly between adjacent frames, the luminance of the light emitting element LD (see FIG. 4) that emits light corresponding to the image data may change significantly. In this case, it is possible to reduce the change in luminance of the light emitting element LD by controlling the magnitude of the driving current applied to the light emitting element LD. The magnitude of the driving current may be adjusted in response to voltages of the gate electrodes of the third and fourth transistors T3 and T4 (see FIG. 4), that is, the gate high voltages VEH of the emission signals EM1 and EM2. More specifically, as the voltages of the gate electrodes of the third and fourth transistors T3 and T4 (see FIG. 4) decrease, the magnitude of the driving current applied to the light emitting element LD may decrease, thereby restricting the luminance of the light emitting element LD.

Therefore, the information collector 71 may measure the second gate high voltages Vadj of the emission signals EM1 and EM2, which may control the change in luminance of the light emitting element within a predetermined critical range despite a quick change in luminance. The second gate high voltage Vadj may be determined in response to the luminance difference between adjacent frames. In addition, the second gate high voltage Vadj may be smaller than the first gate high voltage Vori. Therefore, the greater the luminance difference between adjacent frames, the smaller the second gate high voltage Vadj may be set.

The image determinator 72 may determine whether the display panel 60 is being driven at a low frequency. When the display panel 60 is being driven at the low frequency, the image determinator 72 may acquire the image data DATA to be displayed on the display panel 60 on a frame basis and determine the luminance difference of the image data DATA between adjacent frames. Here, the adjacent frames may be the current frame and the next frame or may be a frame after a predetermined time point and a frame after the above frame. That is, the image determinator 72 is configured to analyze the luminance of the image data DATA to be displayed on the display panel 60 in advance.

The image determinator 72 may determine whether the luminance difference between adjacent frames is greater than or equal to the predetermined critical value. More specifically, the image determinator 72 may determine whether the luminance between adjacent frames increases to the critical or more. For example, such an increase in luminance may occur upon changing from a black grayscale to a white grayscale, upon changing from a low grayscale to a low grayscale, upon changing from a low grayscale to a high grayscale, or upon changing from a high grayscale to a high grayscale.

Such an increase in luminance during the low-frequency driving may occur in the refresh frame RP after the skip frame SP. While the skip frame SP is continuous, such an increase in luminance generally does not occur. Therefore, the adjacent frames may include the refresh frame RP.

The voltage selector 73 may select the gate high voltage VEH of the emission signal EM based on a result of the determination of the image determinator 72. More specifically, when the luminance between adjacent frames increases, remains, or decreases to smaller than the critical value, the voltage selector 73 selects the first gate high voltage Vori as the gate high voltage VEH. For example, during the skip frame SP in which there is no quick change in luminance between adjacent frames during the low-frequency driving, the voltage selector 73 may select the first gate high voltage Vori as the gate high voltage VEH.

Conversely, when the luminance between adjacent frames increases to the critical value or more, the voltage selector 73 selects the second gate high voltage Vadj as the gate high voltage VEH. For example, during the refresh frame RP in which the quick change in luminance between adjacent frames occurs during the low-frequency driving, the voltage selector 73 may select the second gate high voltage Vadj as the gate high voltage VEH.

The voltage selector 73 may transmit control information to the power supply unit 50 (see FIG. 1) and/or the emission driver 40 to output the emission signals EM1 and EM2 according to the selected gate high voltage VEH.

Figure 7:
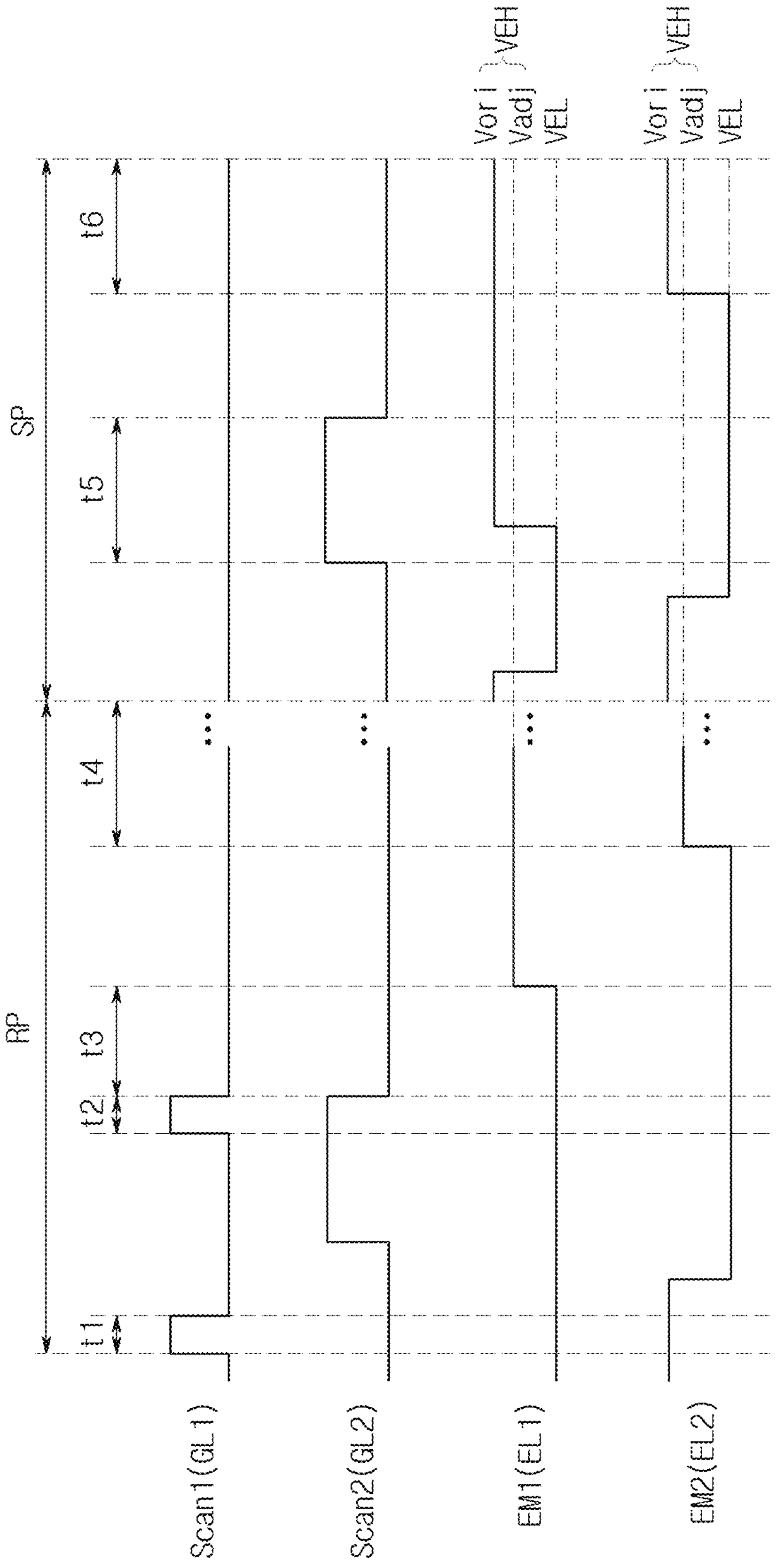
FIG. 7 is a timing diagram showing a method of driving the pixel according to one aspect.

FIG. 7 is a timing diagram showing a method of driving the pixel according to one aspect.

In the variable refresh rate mode, one frame may be configured in a combination of at least one refresh frame RP and at least one skip frame SP.

The refresh period RP may include an initialization period t1, a sampling and programming period t2, a hold period t3, and an emission period t4.

During the initialization period t1, the first scan signal Scan1 at the turn-on level is applied to turn on the second transistor T2 and the fifth transistor T5. In addition, during the initialization period t1, the second emission signal EM2 at the turn-on level is applied to turn on the third transistor T3. Therefore, the initialization voltage Vini may be applied to the fourth node N4, and the high potential driving voltage VDD may be applied to the first node N1.

During the initialization period t1, the anode electrode of the light emitting element LD may be initialized to the initialization voltage Vini in response to the voltage at the fourth node N4, and the gate electrode and first electrode of the driving transistor DT may be set to the high potential driving voltage VDD in response to the voltage at the first node N1. In addition, during the initialization period t1, the storage capacitor Cst may store a voltage corresponding to a difference between the high potential driving voltage VDD and the initialization voltage Vini.

During the sampling and programming period t2, the first scan signal Scan1 and the second scan signal Scan2 at the turn-on level are applied to turn on the first transistor T1, the second transistor T2, and the fifth transistor T5. In addition, during the sampling and programming period t2, the data voltage Vdata corresponding to the image data DATA (see FIG. 1) of the corresponding frame is applied to the data line DL. Therefore, the data voltage Vdata applied to the data line DL may be applied to the second node N2, and the initialization voltage Vini may be applied to the fourth node N4.

During the sampling and programming period t2, the gate electrode and first electrode of the driving transistor DT are electrically connected through the second transistor T2 in the turned-on state. In addition, the voltage previously stored in the storage capacitor Cst, "high potential driving voltage VDD-initialization voltage Vini" may be applied to the gate electrode of the driving transistor DT to turn on the driving transistor DT.

A current flowing through the first electrode and the second electrode may flow in the driving transistor DT in the turn-on state. The current flows until the gate-source voltage Vgs of the driving transistor DT is saturated to the threshold voltage Vth of the driving transistor DT. Therefore, during the sampling and programming period t2, the voltage of the gate electrode of the driving transistor DT, that is, at the third node N3 increases to "data voltage Vdata+threshold voltage Vth."

As the voltage at the third node N3 increases, the storage capacitor Cst stores a voltage corresponding to a difference between the voltage at the third node N3 and the initialization voltage Vini, that is, "the data voltage Vdata+the threshold voltage Vth−the initialization voltage Vini."

During the hold period t3, the first scan signal Scan1 and the second scan signal Scan2 are switched to the turn-off level to turn off the first transistor T1, the second transistor T2, and the fifth transistor T5. During the hold period t3, the voltage at the third node N3 may be maintained stably through the storage capacitor Cst.

During the emission period t4, the first emission signal EM1 and the second emission signal EM2 at the turn-on level are applied to turn on the third transistor T3 and the fourth transistor T4. During the emission period t4, a current path from the high potential driving voltage VDD to the light emitting element LD via the driving transistor DT is formed. Therefore, a driving current having a magnitude corresponding to the voltage programmed to the driving transistor DT may flow along the current path to allow the light emitting element LD to emit light with the corresponding brightness.

The magnitude of the driving current applied to the light emitting element LD is determined according to the gate-source voltage Vgs of the driving transistor DT during the emission period t4. Here, since the gate voltage of the driving transistor DT has a value in which the threshold voltage Vdata of the driving transistor DT has been compensated through sampling, the influence of the change in threshold voltage Vth of the driving transistor DT may be eliminated.

The magnitude of the driving current applied to the light emitting element LD may be further determined according to the gate-source voltages Vgs of the third and fourth transistors T3 and T4. That is, the magnitude of the driving current may be further determined according to the gate voltages of the third and fourth transistors T3 and T4, that is, the voltages of the emission signals EM1 and EM2.

During the emission period t4 of the refresh frame RP, the first emission signal EM1 and the second emission signal EM2 are applied to the gate high voltage VEH controlled by the emission signal voltage controller 70 (see FIG. 6). The gate high voltage VEH may be changed depending on the luminance difference between the image data DATA during the refresh frame RP and the image data DATA during the skip frame SP before the refresh frame RP.

Between the adjacent frames, the luminance may generally increase to the critical value or more. In this case, the gate high voltage VEH is controlled to the second gate high voltage Vadj by the emission signal voltage controller 70 as shown.

The second gate high voltage Vadj may have a lower level than the first gate high voltage Vori (see FIG. 6) applied when the luminance difference between adjacent frames is not considered. Therefore, the driving current applied to the light emitting element LD through the third and fourth transistors T3 and T4 may be controlled to a low level, and as a result, the luminance of the light emitting element LD may be reduced.

When the luminance of the light emitting element LD is controlled in such a way, the quick change in luminance of the light emitting element LD as described with reference to FIG. 3 may be eliminated, and the flicker phenomenon may be prevented. In addition, by reducing the driving current, power consumption of the display device 1 may be reduced, and a low-power display device 1 may be implemented.

The skip frame SP may include an anode initialization period t5 and an emission period t6.

During the anode initialization period t5, the emission signal EM may be switched to the turn-off level to turn off the third transistor T3 and the fourth transistor T4. In addition, during the anode initialization period t5, the second scan signal Scan2 at the turn-on level is applied to turn on the first transistor T1.

During the anode initialization period t5, an anode initialization voltage may be applied to the data line DL. Therefore, the fourth node N4, that is, the anode electrode of the light emitting element LD is initialized to the anode initialization voltage.

During the anode initialization period t5, the light emitting element LD does not emit light by the initialization voltage Vini applied to the anode of the light emitting element LD. Instead, the voltage of the gate electrode of the driving transistor DT may be maintained to the voltage programmed during the previous refresh frame RP by the storage capacitor Cst.

During the emission period t6, the first emission signal EM1 and the second emission signal EM2 at the turn-on level are applied to turn on the third transistor T3 and the fourth transistor T4. During the emission period t4, the light emitting element LD may emit light with the luminance corresponding to the voltage programmed during the previous refresh period RP.

The magnitude of the driving current applied to the light emitting element LD may be further determined according to the gate-source voltages Vgs of the third and fourth transistors T3 and T4. That is, the magnitude of the driving current may be further determined according to the gate voltages of the third and fourth transistors T3 and T4, that is, the voltages of the emission signals EM1 and EM2.

During the emission period t6 of the refresh frame SP, the first emission signal EM1 and the second emission signal EM2 are applied to the gate high voltage VEH controlled by the emission signal voltage controller 70. During the low-frequency driving, the gate high voltage VEH during the skip frame SP may be changed depending on the luminance difference between the image data (DATA) during the previous refresh frame RP or the previous skip frame SP and the image data DATA during the current skip frame SP. Between the adjacent frames, the luminance may generally decrease, remain, or increase to smaller than the critical value. In this case, the gate high voltage VEH is controlled to the first gate high voltage Vori by the emission signal voltage controller 70 as shown.

Meanwhile, during the anode initialization period t5 before the emission period t6, the anode of the light emitting element LD is charged to the anode initialization voltage. Therefore, during the emission period t6, the brightness of the light emitting element LD may reach a target brightness more quickly, thereby minimizing the charging delay of the light emitting element LD.

Figure 8:
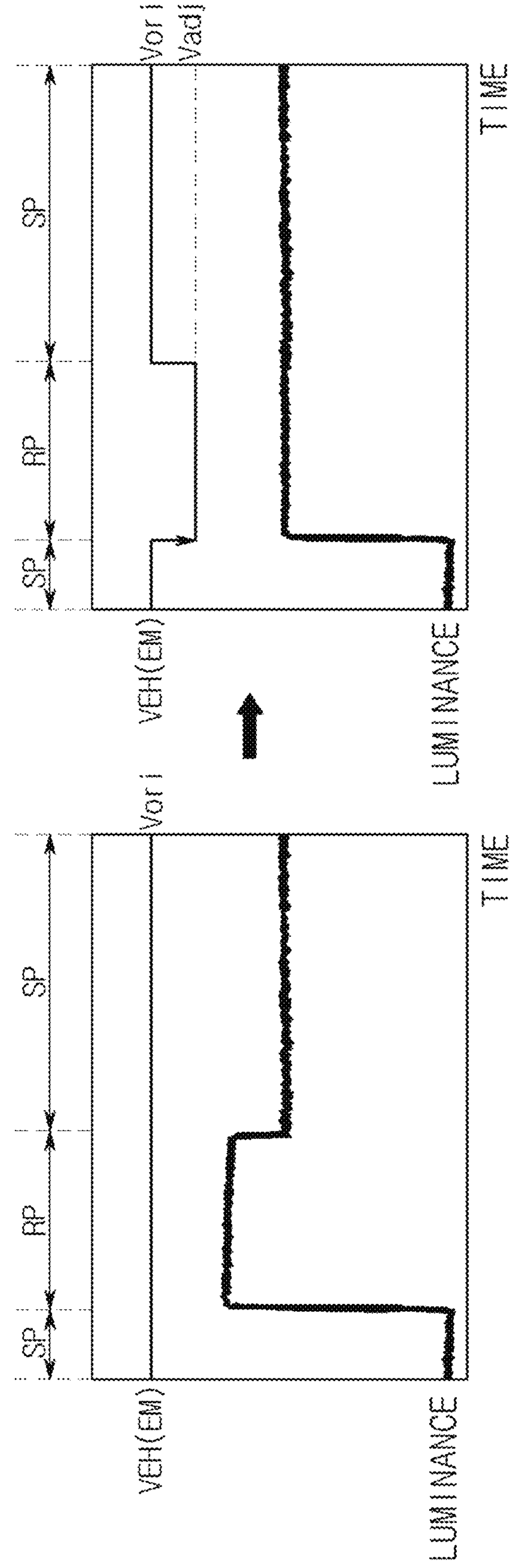
FIG. 8 is a view showing a first aspect of a change in luminance of the pixel according to emission signal voltage control.

FIG. 8 is a view showing a first aspect of a change in luminance of the pixel according to emission signal voltage control.

Referring to FIG. 8, in one aspect, a black grayscale image may be displayed during the skip frame SP, and then a white grayscale image may be displayed during the refresh frame RP. In the present aspect, the image luminance of the skip frame SP and the image luminance of the refresh frame RP are very large at a predetermined threshold value or more. Therefore, the gate high voltage VEH of the emission signal EM applied to the refresh frame RP is set to the second gate high voltage Vadj.

As the gate high voltage VEH is controlled to be a relative low level during the refresh frame RP, the luminance of the light emitting element LD is restricted to a lower level. Therefore, it is possible to eliminate the quick change in luminance of the light emitting element LD during the refresh frame RP and prevent the flicker phenomenon.

During the skip frame SP, since no new image data is applied, the image luminance does not change. Therefore, the gate high voltage VEH of the emission signal EM applied during the skip frame SP is set to the first gate high voltage Vori.

Therefore, the light emitting element LD may emit light with a luminance corresponding to the driving current controlled according to the first gate high voltage Vori.

Figure 9:
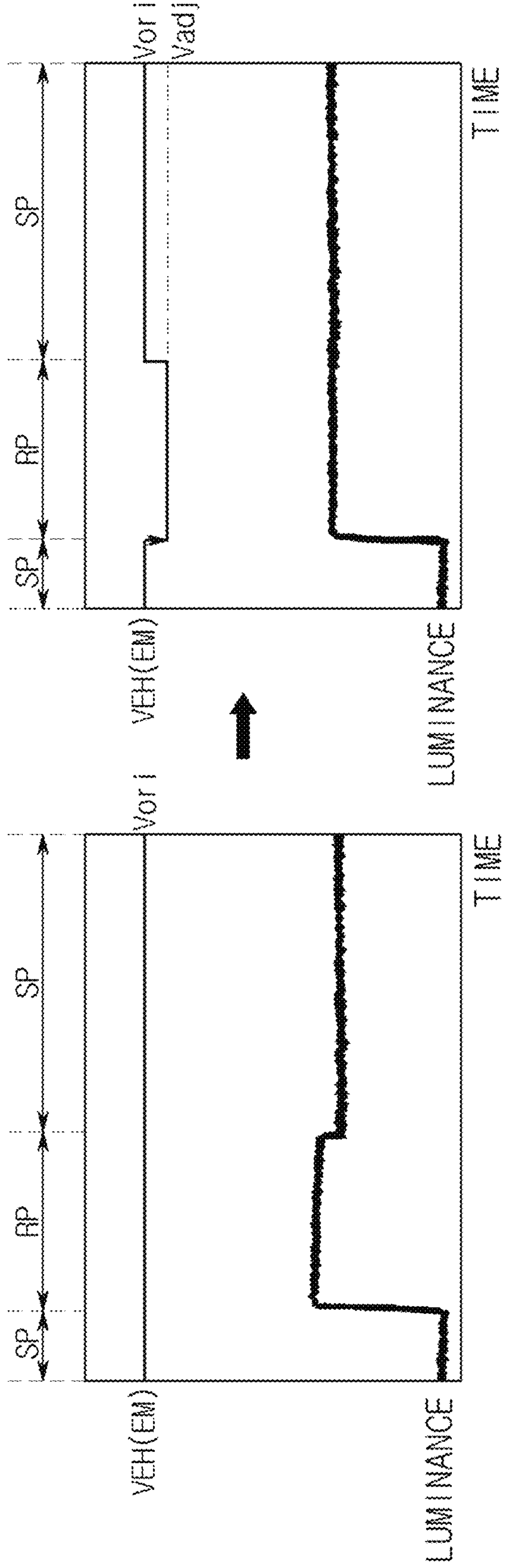
FIG. 9 is a view showing a second aspect of the change in luminance of the pixel according to the emission signal voltage control.

FIG. 9 is a view showing a second aspect of the change in luminance of the pixel according to the emission signal voltage control.

Referring to FIG. 9, in one aspect, a first low grayscale image may be displayed during the skip frame SP, and then a second low grayscale image may be displayed during the refresh frame RP. Here, the second low grayscale may be higher than the first low grayscale.

In the present aspect, the image luminance of the skip frame SP and the image luminance of the refresh frame RP may be very large at a predetermined threshold value or more. Therefore, the gate high voltage VEH of the emission signal EM applied during the refresh frame RP is set to the second gate high voltage Vadj.

As the gate high voltage VEH is controlled to be a relative low level during the refresh frame RP, the luminance of the light emitting element LD is restricted to a lower level. Therefore, it is possible to eliminate the quick change in luminance of the light emitting element LD during the refresh frame RP and prevent the flicker phenomenon.

Meanwhile, the second gate high voltage Vadj according to the aspect of FIG. 9 has a higher level than the second gate high voltage Vadj according to the aspect of FIG. 8. Since the luminance difference between adjacent frames is smaller than that in the aspect of FIG. 8, the second gate high voltage Vadj may be set to a relatively high level corresponding to the luminance difference.

During the skip frame SP, since no new image data is applied, the image luminance does not change. Therefore, the gate high voltage VEH of the emission signal EM applied during the skip frame SP is set to the first gate high voltage Vori.

Therefore, the light emitting element LD may emit light with a luminance corresponding to the driving current controlled according to the first gate high voltage Vori.

Figure 10:
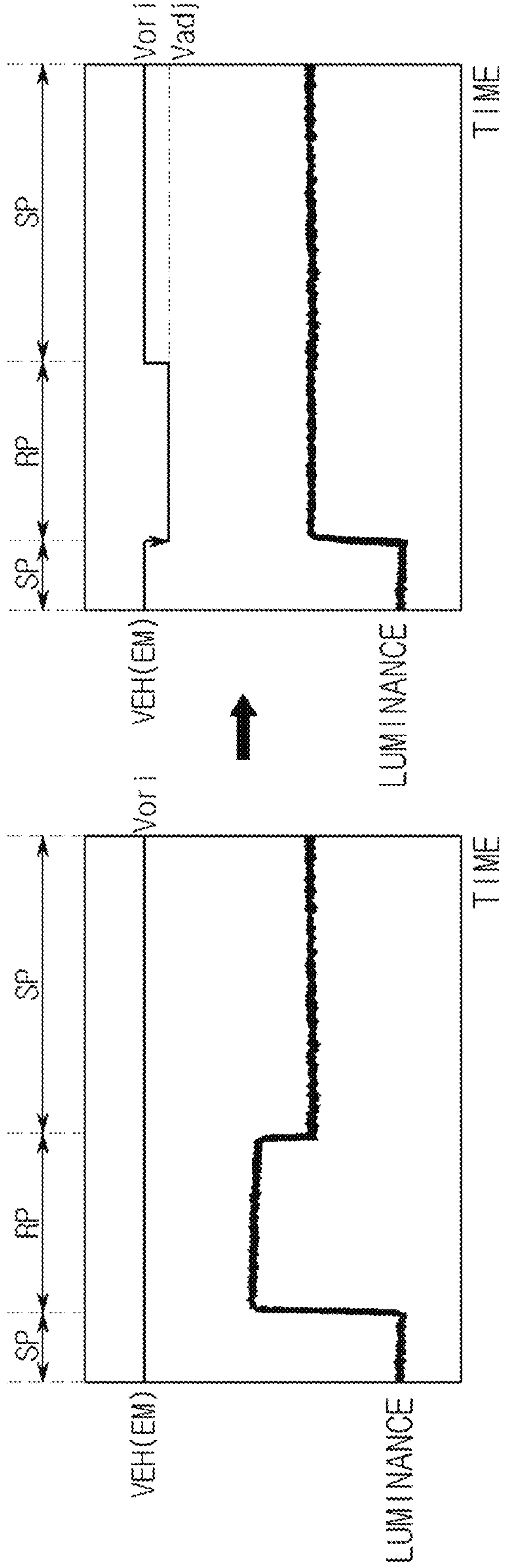
FIG. 10 is a view showing a third aspect of the change in luminance of the pixel according to the emission signal voltage control.

FIG. 10 is a view showing a third aspect of the change in luminance of the pixel according to the emission signal voltage control.

Referring to FIG. 10, in one aspect, a low grayscale image may be displayed during the skip frame SP, and then a high grayscale image may be displayed during the refresh frame RP. In the present aspect, the image luminance of the skip frame SP and the image luminance of the refresh frame RP may be very large at a predetermined threshold value or more. Therefore, the gate high voltage VEH of the emission signal EM applied during the refresh frame RP is set to the second gate high voltage Vadj.

As the gate high voltage VEH is controlled to be a relative low level during the refresh frame RP, the luminance of the light emitting element LD is restricted to a lower level. Therefore, it is possible to eliminate the quick change in luminance of the light emitting element LD during the refresh frame RP and prevent the flicker phenomenon.

Meanwhile, the second gate high voltage Vadj according to the aspect of FIG. 10 has a higher level than the second gate high voltage Vadj according to the aspect of FIG. 8. Since the luminance difference between adjacent frames is smaller than that in the aspect of FIG. 8, the second gate high voltage Vadj may be set to a relatively high level corresponding to the luminance difference.

During the skip frame SP, since no new image data is applied, the image luminance does not change. Therefore, the gate high voltage VEH of the emission signal EM applied during the skip frame SP is set to the first gate high voltage Vori.

Therefore, the light emitting element LD may emit light with a luminance corresponding to the driving current controlled according to the first gate high voltage Vori.

Figure 11:
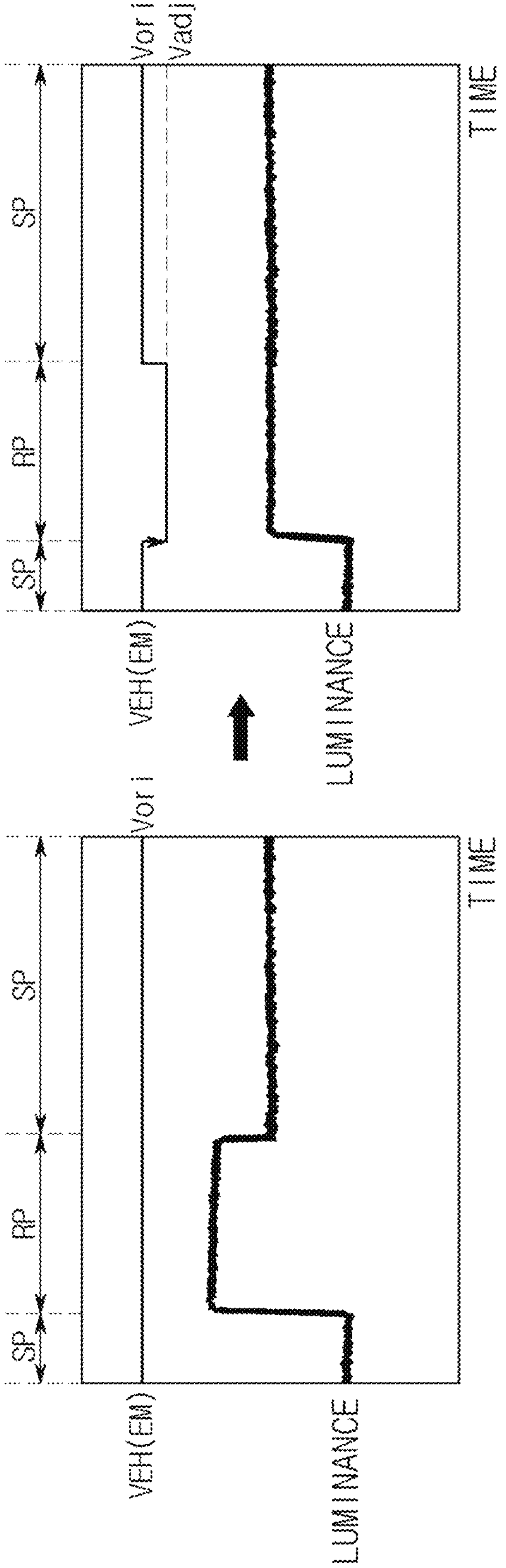
FIG. 11 is a view showing a fourth aspect of the change in luminance of the pixel according to the emission signal voltage control.

FIG. 11 is a view showing a fourth aspect of the change in luminance of the pixel according to the emission signal voltage control.

Referring to FIG. 11, in one aspect, a first high grayscale image may be displayed during the skip frame SP, and then a second high grayscale image may be displayed during the refresh frame RP. Here, the second high grayscale may be higher than the first high grayscale.

In the present aspect, the image luminance of the skip frame SP and the image luminance of the refresh frame RP may be very large at a predetermined threshold value or more. Therefore, the gate high voltage VEH of the emission signal EM applied during the refresh frame RP is set to the second gate high voltage Vadj.

As the gate high voltage VEH is controlled to be a relative low level during the refresh frame RP, the luminance of the light emitting element LD is restricted to a lower level. Therefore, it is possible to eliminate the quick change in luminance of the light emitting element LD during the refresh frame RP and prevent the flicker phenomenon.

Meanwhile, the second gate high voltage Vadj according to the aspect of FIG. 11 has a higher level than the second gate high voltage Vadj according to the aspect of FIG. 8. Since the luminance difference between adjacent frames is smaller than that in the aspect of FIG. 8, the second gate high voltage Vadj may be set to a relatively high level corresponding to the luminance difference.

During the skip frame SP, since no new image data is applied, the image luminance does not change. Therefore, the gate high voltage VEH of the emission signal EM applied during the skip frame SP is set to the first gate high voltage Vori.

Therefore, the light emitting element LD may emit light with a luminance corresponding to the driving current controlled according to the first gate high voltage Vori.

According to the display device and the method of driving the same according to the aspects, it is possible to minimize the image abnormality phenomenon, such as flicker, caused by a quick change in luminance during low-frequency driving.

According to the display device and the method of driving the same according to the aspects, there is no need for the separate control of the frequency or the data voltage by preventing the flicker phenomenon through the voltage control of the emission signal.

According to the display device and the method of driving the same according to the aspects, it is possible to prevent the energy biasing phenomenon in which the light emitting element is brightly visible due to the quick change in luminance, thereby improving the reliability of the light emitting element.

According to the display device and the method of driving the same according to the aspects, it is possible to reduce the consumed power by reducing the voltage of the emission signal.

Therefore, according to the display device and the method of driving the same according to the aspects, it is possible to improve the operational characteristics of the display device, thereby reducing the consumed power and implementing the low-power display device.

Although the aspects of the present disclosure have been described above with reference to the accompanying drawings, those skilled in the art to which the present disclosure pertains will be able to understand that the above-described technical configuration of the present disclosure may be carried out in other specific forms without changing the technical spirit or features thereof. Therefore, it should be understood that the above-described aspects are illustrative and not restrictive in all respects. In addition, the scope of the present disclosure is described by the claims to be described below rather than the detailed description. In addition, the meaning and scope of the claims and all changed or modified forms derived from the equivalent concept should be construed as being included in the scope of the present disclosure.

What is claimed is:

1. A display device comprising:

a display panel at which pixels are disposed;

a timing controller configured to output image data and an emission driving control signal based on an image signal and a control signal that are output from an external component;

a gate driver configured to apply a gate signal to the pixels;

a data driver configured to apply a data voltage corresponding to the image data to the pixels;

an emission driver configured to apply an emission signal to the pixels based on the emission driving control signal; and an emission signal voltage controller configured to change a voltage of the emission signal, wherein the emission signal is a square wave signal including a gate high voltage period and a gate low voltage period, wherein the display panel is driven in a combination of a refresh frame in which the data voltage is programmed to the pixels and one or more skip frames in which the programming of the data voltage is omitted during low-frequency driving, wherein the emission signal voltage controller changes a level of the gate high voltage based on a luminance difference of the image data between adjacent frames, and wherein, based on the luminance difference between the adjacent frames being greater than a critical value, the emission signal voltage controller is configured to set the level of the gate high voltage to a second gate high voltage during the refresh frame, and sets the level of the gate high voltage to a first gate high voltage greater than the second gate high voltage during the one or more skip frames after the refresh frame.

2. The display device of claim 1, wherein the emission signal voltage controller is configured to:

set the level of the gate high voltage to the first gate high voltage based on the luminance difference between the adjacent frames being smaller than a critical value.

3. The display device of claim 2, wherein the adjacent frames include the refresh frame.

4. The display device of claim 2, wherein the emission signal voltage controller includes:

an information collector configured to measure a first frame response time during low-frequency driving, determine the first gate high voltage in response to the first frame response time, and determine the second gate high voltage for allowing the luminance difference between the adjacent frames to be smaller than the critical value;

an image analyzer configured to acquire the image data on a frame basis based on the display panel being driven at the low frequency and determine the luminance difference of the image data between the adjacent frames; and a voltage selector configured to select the first gate high voltage as the gate high voltage based on the luminance difference being smaller than the critical value and select the second gate high voltage as the gate high gate voltage based on the luminance difference being greater than or equal to the critical value.

5. The display device of claim 2, wherein the emission driver includes:

a level shifter configured to generate a clock signal having a level between the gate high voltage and the gate low voltage; and a shift register configured to output the emission signal based on the clock signal output from the level shifter.

6. The display device of claim 1, wherein the pixel includes:

a light emitting element configured to emit light with a luminance corresponding to a driving current;

a driving transistor configured to control the driving current flowing through the light emitting element;

a first transistor configured to apply the data voltage to a second electrode of the driving transistor in response to a second scan signal;

a second transistor configured to connect a gate electrode to a first electrode of the driving transistor in response to a first scan signal;

a storage capacitor connected between the gate electrode of the driving transistor and an anode electrode of the light emitting element;

a third transistor configured to form a current path between a high potential driving voltage and the first electrode of the driving transistor in response to a second emission signal; and a fourth transistor configured to form a current path between the driving transistor and the light emitting element in response to a first emission signal.

7. The display device of claim 6, wherein the driving current is controlled as the gate high voltages of the first emission signal and the second emission signal are changed.

8. The display device of claim 6, wherein the pixel further includes a fifth transistor configured to apply an initialization voltage to the anode electrode of the light emitting element in response to the first scan signal.

9. A method of driving a display device including a display panel at which pixels are disposed and an emission driver for applying an emission signal to the pixels, the emission signal is a square wave signal including a gate high voltage period and a gate low voltage period, the method comprising:

determining a luminance difference of image data between adjacent frames, wherein a data voltage corresponding to image data is programmed to the pixels during a refresh frame, and the programming of the data voltage is omitted during one or more skip frames;

driving, based on the luminance difference being greater than a critical value, the display panel with the refresh frame during which the emission driver applies the emission signal having a second gate high voltage smaller than a first gate high voltage to the pixels during low-frequency driving; and driving the display panel with one or more skip frames after the refresh frame during which the emission driver applies the emission signal having the first gate high voltage to the pixels during low-frequency driving.

10. The method of claim 9, wherein a data voltage corresponding to image data is programmed to the pixels during the refresh frame, and wherein the programming of the data voltage is omitted during the one or more skip frame.

11. The method of claim 9, wherein the second gate high voltage is determined based on a luminance difference between adjacent frames.

12. The method of claim 9, wherein the first gate high voltage is determined according to a first frame response time during the low-frequency driving.

* * * * *